(12) United States Patent
Kim et al.

(10) Patent No.: US 8,842,999 B2
(45) Date of Patent: Sep. 23, 2014

(54) OPTICAL NETWORK UNIT AND METHOD OF SAVING POWER THEREOF

(75) Inventors: Sung Chang Kim, Gwangju (KR); Geun Yong Kim, Goyang-si (KR); Hark Yoo, Gwangju (KR); Youngsuk Lee, Gwangju (KR); Sim-Kwon Yoon, Gwangju (KR); Jong Deog Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 474 days.

(21) Appl. No.: 13/237,188

(22) Filed: Sep. 20, 2011

(65) Prior Publication Data

US 2012/0163805 A1 Jun. 28, 2012

(30) Foreign Application Priority Data

Dec. 23, 2010 (KR) .......................... 10-2010-0133075

(51) Int. Cl.
*H04B 10/04* (2006.01)
*H04J 3/00* (2006.01)
*H04Q 11/00* (2006.01)

(52) U.S. Cl.
CPC ... *H04Q 11/0067* (2013.01); *H04Q 2011/0079* (2013.01); *H04Q 11/00* (2013.01); *H04J 3/00* (2013.01)
USPC ................. 398/197; 398/94; 398/66; 398/67; 398/38

(58) Field of Classification Search
CPC .. H04B 10/564; H04L 41/0833; Y02B 60/50; H04J 14/0221
USPC .......... 398/197, 38, 66–72, 94, 120, 171, 25, 398/45
See application file for complete search history.

(56) References Cited

U.S. PATENT DOCUMENTS

| 5,967,413 | A | * | 10/1999 | Tian | 239/88 |
| 7,330,438 | B2 | * | 2/2008 | Kim et al. | 370/249 |
| 8,346,082 | B2 | * | 1/2013 | Yoon et al. | 398/72 |
| 8,559,814 | B2 | * | 10/2013 | Horishita et al. | 398/25 |
| 8,565,601 | B2 | * | 10/2013 | Nakura et al. | 398/72 |
| 8,667,313 | B2 | * | 3/2014 | Kim | 713/322 |
| 8,687,960 | B2 | * | 4/2014 | Hirano et al. | 398/58 |
| 8,705,965 | B2 | * | 4/2014 | Sugawa et al. | 398/67 |
| 2005/0202792 | A1 | * | 9/2005 | Lee et al. | 455/136 |
| 2005/0210300 | A1 | * | 9/2005 | Song et al. | 713/300 |

(Continued)

FOREIGN PATENT DOCUMENTS

| JP | 2008-113193 | 5/2008 |
| KR | 10-0539804 | 1/2006 |
| KR | 10-0932908 | 12/2009 |

*Primary Examiner* — Daniel Washburn
*Assistant Examiner* — Hibret Woldekidan
(74) *Attorney, Agent, or Firm* — Nelson Mullins Riley & Scarborough LLP; Anthony A. Laurentano, Esq.; Lewis Lee, Esq.

(57) ABSTRACT

Provided is an optical network unit saving power. The optical network unit may include a processor checking whether at least one downward physical block, the upward physical block and a data switching block operate in an idle mode, sequentially transiting at least one downward physical block, an upward physical block and a data switching block to a sleep mode according to the checking result and sequentially transiting an optical transmission-reception block and the medium access control block to a sleep mode by judging whether or not a medium access control block transits to a sleep mode.

5 Claims, 4 Drawing Sheets

(56) References Cited

U.S. PATENT DOCUMENTS

| | | | |
|---|---|---|---|
| 2007/0220530 A1* | 9/2007 | Hsieh | 719/327 |
| 2008/0212564 A1* | 9/2008 | Lee et al. | 370/350 |
| 2008/0212964 A1 | 9/2008 | Gao et al. | |
| 2009/0036050 A1* | 2/2009 | Min et al. | 455/7 |
| 2012/0008937 A1* | 1/2012 | Cheng et al. | 398/1 |
| 2012/0045210 A1* | 2/2012 | Kim et al. | 398/66 |
| 2012/0051748 A1* | 3/2012 | Hotta et al. | 398/58 |
| 2012/0114331 A1* | 5/2012 | Kamijo et al. | 398/35 |
| 2012/0148972 A1* | 6/2012 | Lewis | 433/10 |
| 2012/0163808 A1* | 6/2012 | Kim et al. | 398/30 |
| 2012/0308228 A1* | 12/2012 | Tanaka et al. | 398/25 |
| 2013/0156426 A1* | 6/2013 | Kim et al. | 398/45 |
| 2013/0202293 A1* | 8/2013 | Boyd et al. | 398/38 |
| 2013/0315587 A1* | 11/2013 | Mukai et al. | 398/45 |
| 2013/0330074 A1* | 12/2013 | Kikuzawa et al. | 398/38 |
| 2014/0079396 A1* | 3/2014 | Hirano et al. | 398/67 |
| 2014/0133843 A1* | 5/2014 | Kim et al. | 398/9 |

* cited by examiner

OPTICAL NETWORK UNIT AND METHOD OF SAVING POWER THEREOF

CROSS-REFERENCE TO RELATED APPLICATIONS

This U.S. non-provisional patent application claims priority under 35 U.S.C. §119 of Korean Patent Application No. 10-2010-0133075, filed on Dec. 23, 2010, the entire contents of which are hereby incorporated by reference.

BACKGROUND

The present inventive concept herein relates to optical communication systems, and more particularly, to an optical network unit minimizing power consumption and a method of saving power thereof.

In an illustration of optical communication system, an optical network unit (ONU) in a fiber to the home (FTTH) connects a subscriber terminal (for example, a personal computer (PC), a notebook computer, etc.) to a network. If the optical network unit (ONU) does not switch off when traffic does not exist, it may have a relatively long standby time as compared with a time during which traffic exists by internet use of subscriber.

To achieve this, various methods of saving power in a next generation fiber to the home (FTTH) have been suggested. The suggested methods of saving power control only an operation state of optical transmission-reception module block in charge of the connection to a fiber to the home (FTTH) in an optical network unit (ONU) depending on whether traffic exists or not.

However, an optical network unit (ONU) includes various functional blocks besides the optical transmission-reception module block. All but the optical transmission-reception module block consume power continuously even when traffic does not exist. Thus, there may be a limitation of saving power only by controlling the optical transmission-reception module block to save power in the existing optical network unit (ONU).

SUMMARY

Embodiments of the inventive concept provide an optical network unit. The optical network unit may include at least one downward physical block processing a downward link packet; an upward physical block processing an upward link packet; a data switching block switching the upward/downward link packet; a medium access control block performing a passive optical network unit protocol on the upward/downward link packet; an optical transmission-reception block transmitting-receiving the upward/downward link packet between the medium access control block and a network; and a processor checking whether at least one downward physical block, the upward physical block and the data switching block operate in an idle mode, sequentially transiting at least one downward physical block, the upward physical block and the data switching block to a sleep mode according to the checking result and sequentially transiting the optical transmission-reception block and the medium access control block to a sleep mode by judging whether or not the medium access control block transits to a sleep mode.

Embodiments of the inventive concept also provide a method of saving power of an optical network unit. The method may include collecting state information of at least one downward physical block and then transiting the downward physical block operating in an idle mode to a sleep mode; transiting an upward physical block to a sleep mode if at least one downward physical block transits to a sleep mode; transiting a data switching block to a sleep mode if the upward physical block transits to a sleep mode; determining a transition of a medium access control block to a sleep mode if the data switching block transits to a sleep mode; transiting an optical transmission-reception block to a sleep mode if the medium access control block transits to a sleep mode according to the determination; transiting the medium access control block to a sleep mode if the optical transmission-reception block to a sleep mode; and transiting an operation of a processor to a sleep mode if at least one downward physical block, the upward physical block, the data switching block, the medium access control block and the optical transmission-reception block transit to a sleep mode.

BRIEF DESCRIPTION OF THE FIGURES

The foregoing and other features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention. In the drawings, the thickness of layers and regions are exaggerated for clarity.

DETAILED DESCRIPTION OF THE EMBODIMENTS

Figure 1:
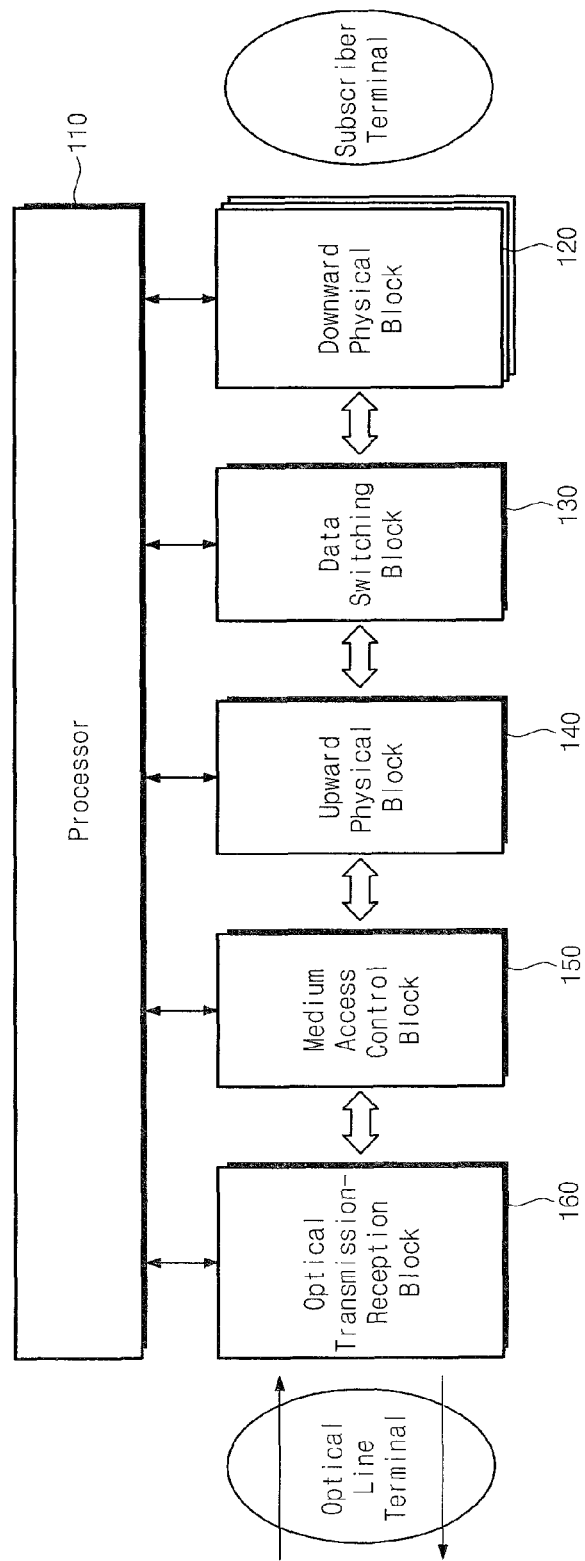
FIG. 1 is a drawing illustrating an optical network unit in accordance with some embodiments of the inventive concept.

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. In the drawings, embodiments of the inventive concept are exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The inventive concept provides an optical network unit (ONU) saving power in an optical communication system. A network to which an optical network unit (ONU) of the inventive concept is connected is called, for example, a fiber to the home (FTTH). However, the inventive concept may be applied to other networks to which an optical network unit (ONU) can be connected.

FIG. 1 is a drawing illustrating an optical network unit in accordance with some embodiments of the inventive concept.

Referring to FIG. 1, an optical network unit includes a processor 110, downward physical blocks 120, a data switching block 130, an upward physical block 140, a medium access control (MAC) block 150 and an optical transmission-reception block 160.

The process 110 controls an operation of each of functional blocks in the optical network unit. The process 110 may be called, for example, a central processing unit (CPU). The processor 110 may control an operation of saving power of the optical network unit suggested by the inventive concept.

The downward physical blocks 120 process a downward link packet being received through the data switching block 130. The downward physical blocks 120 process a downward link packet being transmitted to a subscriber terminal. The downward physical blocks 120 output an upward link packet output from the subscriber terminal to the data switching block 130. The downward physical block 120 is described to be the plural number in the present embodiment. However, the downward physical block 120 may be one downward physical block.

The data switching block 130 performs a packet switching between the downward physical blocks 120 and the upward physical block 140. The data switching block 130 is switched to the corresponding downward physical block 120 to transmit a downward link packet received through the upward physical block 140 to a subscriber terminal. The data switching block 130 is switched to the upward physical block 140 to transmit an upward link packet received through the downward physical blocks 120 to an optical line terminal (OLT). Thus, the data switching block 130 may perform a switching function and a forwarding function of upward/downward link packet (that is, an upward link packet or a downward link packet). The data switching block 130 may be embodied by various chips such as a switch chip, a digital subscriber line access multiplexer (DSLAM) chip, a WiFi chip, a time division multiplexing (TDM) chip or the like according to a subscriber terminal characteristic.

The upward physical block 140 processes an upward link packet being received through the data switching block 130. The upward physical block 140 processes an upward link packet being transmitted to an optical line terminal (OLT). The upward physical block 140 outputs a downward link packet output from the medium access control (MAC) block 150 to the data switching block 130.

The downward physical blocks 120, the data switching block 130 and the upward physical block 140 may be embodied to separate chips respectively or one chip. As an illustration, a '1x12' Ethernet switch may be comprised of the downward physical blocks 120, the data switching block 130 (or switch core) and the upward physical block 140. Herein, the '1x12' Ethernet switch may include twelve downward physical blocks 120 and one upward physical block 140.

The medium access control (MAC) block 150 performs a passive optical network (PON) protocol process on an upward/downward link packet.

The medium access control (MAC) block 150 converts data of a frame form received from the optical transmission-reception block 160 into a downward link packet. The medium access control (MAC) block 150 outputs the converted downward link packet to the upward physical block 140. The medium access control (MAC) block 150 converts an upward link packet received from the upward physical block 140 into a frame form. The medium access control (MAC) block 150 outputs the upward link packet converted into a frame form to the optical transmission-reception block 160.

The optical transmission-reception block 160 transmits and receives an upward/downward link packet (e.g., a frame form) between the medium access control (MAC) block 150 and a network. The optical transmission-reception block 160 interfaces with a network, for example, an optical line terminal.

A transmission path of downward/upward link traffic is as follows.

The downward link traffic is transmitted in order of the optical transmission-reception block 160, the medium access control (MAC) block 150, the upward physical block 140, the data switching block 130 and the downward physical blocks 120. At this time, the medium access control (MAC) block 150 may output a control packet or a management packet being provided to an optical network unit to the processor 110.

The upward link traffic is transmitted in order of the downward physical blocks 120, the data switching block 130, the upward physical block 140, the medium access control (MAC) block 150 and the optical transmission-reception block 160.

Thus, the downward physical blocks 120, the data switching block 130, the upward physical block 140, the medium access control (MAC) block 150 and the optical transmission-reception block 160 may each include a transmission block or a reception block for processing an upward link traffic and a downward link traffic therein.

In the inventive concept, each of the functional blocks 110, 120, 130, 140, 150 and 160 may operate in a normal mode or a sleep mode. The normal mode is a mode in which each functional block normally operates and a normal electric power is supplied. The sleep mode is a mode which the inventive concept suggests and a mode in which only the minimum electric power is consumed to minimize power consumption. The sleep mode may be an operation mode cutting off an electric power to functional blocks that do not need power consumption.

The processor 110 may sequentially operate the functional blocks 120, 130, 140, 150 and 160 in a sleep mode according to an operation state (e.g., whether or not a packet (or traffic) that is transmitted or received exists) of the functional blocks 120, 130, 140, 150 and 160. The operation order of sleep mode is the order of the downward physical blocks 120, the upward physical block 140, the data switching block 130, the optical transmission-reception block 160 and the medium access control (MAC) block 150. Also, if all the functional blocks transit to a sleep mode, the processor 110 transits an operation of the processor 110 to the sleep mode, thereby saving power.

An operation of the processor 110 for saving power is described in detail below.

The processor 110 checks an operation state of the downward physical blocks 120 and then transits the downward physical blocks 120 operating in an idle state to a sleep mode. In the idle state, only an electric power is consumed in a state in which traffic does not exist.

If all the downward physical blocks 120 transit to a sleep mode, the processor 110 transits the upward physical block 140 to a sleep mode. If the upward physical block 140 transits to a sleep mode, the processor 110 transits the data switching block 130 to a sleep mode.

Subsequently, the processor 110 may determine to transit the medium access control (MAC) block 150 to a sleep mode. To determine the transition of the medium access control (MAC) block 150 to a sleep mode, the processor may monitor traffic of the medium access control (MAC) block 150 or may judge whether the data switching block 130 operates in a sleep mode or not.

If the transition of the medium access control (MAC) block 150 to a sleep mode is determined, the processor 110 transits the optical transmission-reception block 160 to a sleep mode. If the optical transmission-reception block 160 transits to a sleep mode, the processor 110 transits the medium access control (MAC) block 150 to a sleep mode.

If the processor 110 transits the functional blocks 120, 130, 140, 150 and 160 except the processor 110 to a sleep mode, the processor 110 transits an operation of the processor 110 to a sleep mode.

The optical network unit (ONU) of the inventive concept transits the functional blocks 110, 120, 130, 140 and 150 besides the optical transmission-reception block 160 to a sleep mode, thereby minimizing power consumption of the optical network unit (ONU).

Figure 2:
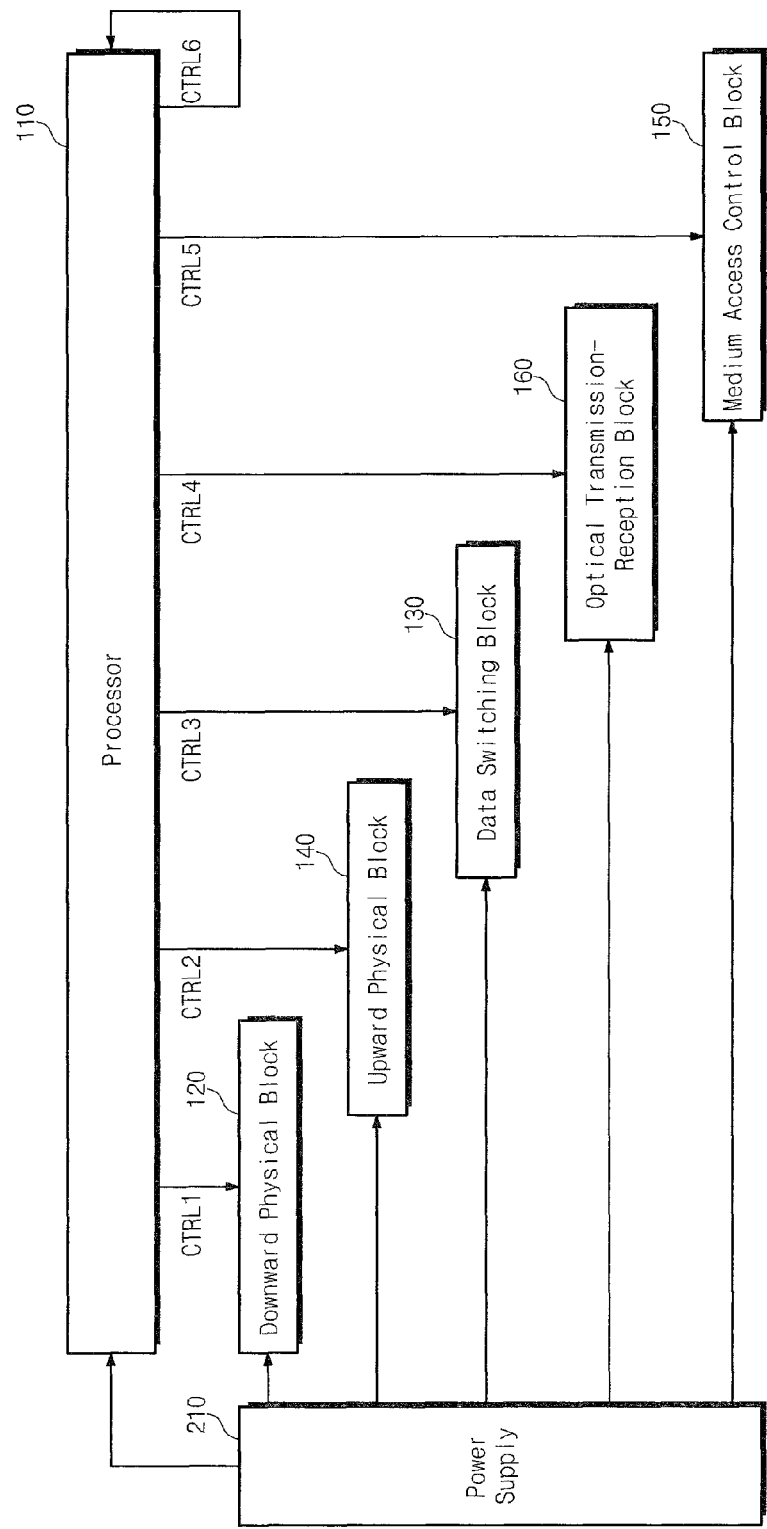
FIG. 2 is a drawing illustrating a power control operation of optical network unit in accordance with some embodiments of the inventive concept.

FIG. 2 is a drawing illustrating a power control operation of optical network unit in accordance with some embodiments of the inventive concept.

Referring to FIG. 2, a power supply 210 supplies an electric power to the functional blocks 110, 120, 130, 140, 150 and 160 of the optical network unit (ONU).

The power supply 210 may exists inside the optical network unit (ONU) or outside the optical network unit (ONU). The processor 110 outputs control signals CTRL1-CTRL6 to operate the functional blocks in a sleep mode in the order of the downward physical blocks 120, the upward physical block 140, the data switching block 130, the optical transmission-reception block 160 and the medium access control (MAC) block 150.

All the functional blocks 110, 120, 130, 140, 150 and 160 may each support a low power operation for a sleep mode operation.

For example, the downward physical block 120 which received a control signal CTRL1 for transition to a sleep mode may perform a low power operation reducing data transmission rate. At this time, the downward physical block 120 may reduce data transmission rate from 1 Gbps to 10 Mbps. Also, the downward physical block 120 which received a control signal CTRL1 for transition to a sleep mode may perform a low power operation through a periodic on/off operation of electric power.

The functional blocks 110, 130, 140, 150 and 160 may perform a low power operation on each functional block like the downward physical block 120.

The optical network unit (ONU) supporting a dozing mode may transit only a transmission block in each functional block to a sleep mode. At this time, a receiving block in each functional block may operate in a normal mode.

However, the optical network unit (ONU) supporting a cyclic sleep mode may transit a transmission block and a receiving block in each functional block to a sleep mode at the same time.

According to a mode which the optical network unit (ONU) supports, a sleep mode operation of a transmission block or a receiving block in each functional block may be controlled.

When the functional blocks 120, 130, 140, 150 and 160 transit from a sleep mode to a normal mode due to traffic occurrence, the processor 110 may operate the functional blocks 120, 130, 140, 150 and 160 in a normal mode in the order of the medium access control (MAC) block 150, the optical transmission-reception block 160, the data switching block 130, the upward physical block 140 and the downward physical blocks 120.

Figure 3:
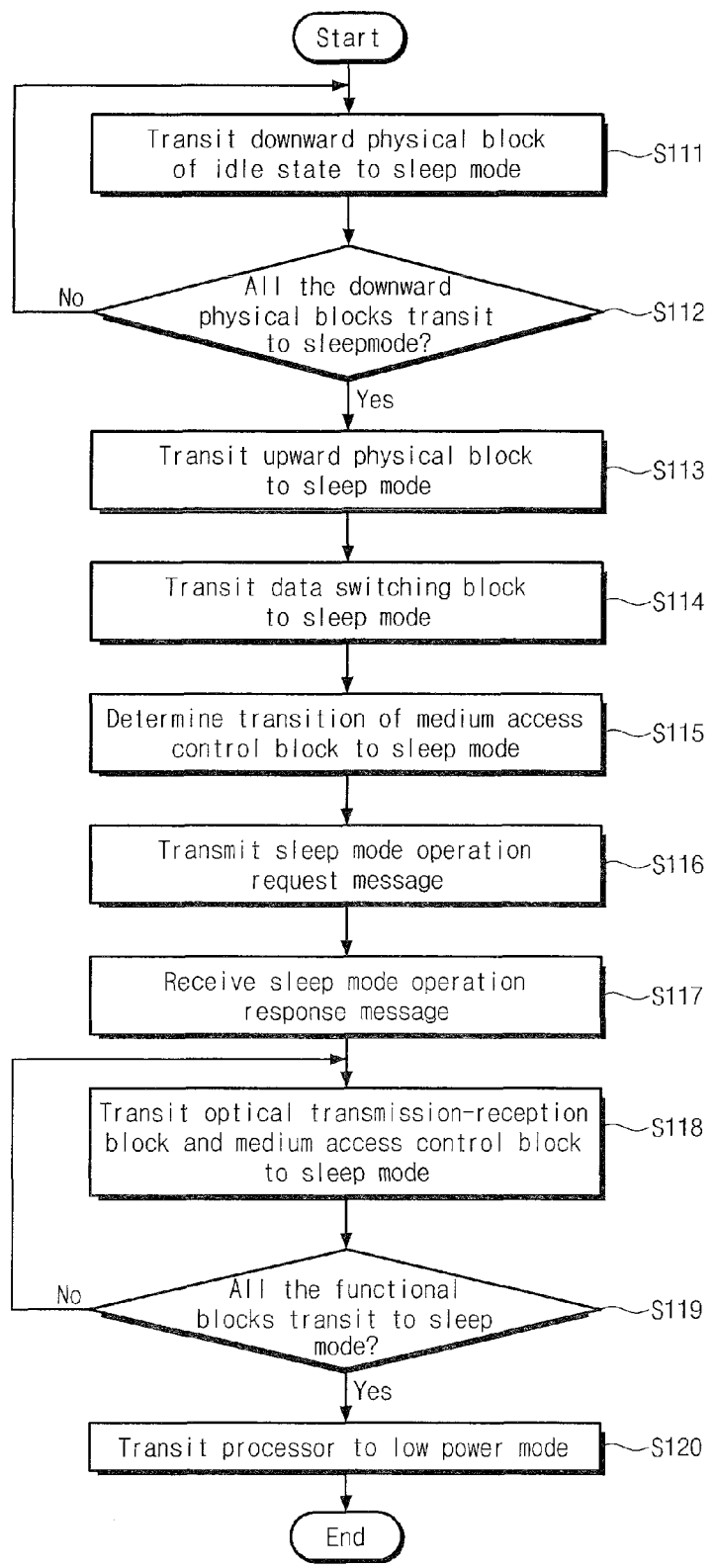
FIG. 3 is a flow chart illustrating an operation of saving power of optical network unit in accordance with some embodiments of the inventive concept.

FIG. 3 is a flow chart illustrating an operation of saving power of optical network unit in accordance with some embodiments of the inventive concept.

Referring to FIG. 3, in a step of S111, the processor 110 transits the downward physical block 120 operating in an idle mode to a sleep mode. The processor 110 collects state information periodically through the data switching block 130. Herein, the state information may include at least one of a medium access control table, traffic monitoring statistics and an operation interrupt. The processor 110 may judge an idle state of the downward physical block 120 using the state information. The processor 110 transits the downward physical block 120 operating in an idle state to a sleep mode.

In a step of S112, the processor 110 judges whether all the downward physical blocks 120 transit to a sleep mode. According to the judgment of the step of S112, if all the downward physical blocks 120 do not transit to a sleep mode, the processor 110 goes to the step of S111. According to the judgment of the step of S112, if all the downward physical blocks 120 transit to a sleep mode, the processor 110 goes to the step of S113.

In a step of S113, the processor 110 transits the upward physical block 140 to a sleep mode.

In a step of S114, the processor 110 transits the data switching block 130 to a sleep mode.

In a step of S115, the processor 110 determines a transition of the medium access control (MAC) block 150 to a sleep mode. If the medium access control (MAC) block 150 has a traffic monitoring function, the processor 110 may check whether traffic exists or not through the medium access control (MAC) block 150. If traffic does not exist, the processor 110 may determine a transition of the medium access control (MAC) block 150 to a sleep mode. If the medium access control (MAC) block 150 does not have a traffic monitoring function, the processor 110 may check whether traffic exists or not through whether the data switching block 130 operates in a sleep mode or not. If the data switching block 130 operates in a sleep mode, the processor 110 may determine a transition of the medium access control (MAC) block 150 to a sleep mode.

In a step of S116, the processor 110 transmits a sleep mode operation request message requesting a transition to a sleep mode to the optical network unit.

In a step of S117, the processor 110 receives a sleep mode transition response message corresponding to the sleep mode operation request message (including information which determined whether or not transiting to a sleep mode) from the optical line terminal (OLT).

In a step of S118, the processor 110 which checked a sleep mode transition through the sleep mode transition response message transits the optical transmission-reception block 160 to a sleep mode. Also, if the optical transmission-reception block 160 transits to a sleep mode, the processor 110 transits the medium access control (MAC) block 150 to a sleep mode.

In a step of S119, the processor 110 checks whether all the functional blocks 120, 130, 140, 150 and 160 transit to a sleep mode or not. According to a check of the step of S119, if all the functional blocks 120, 130, 140, 150 and 160 do not transit to a sleep mode, the processor 110 goes to the step of S118. If all the functional blocks 120, 130, 140, 150 and 160 transit to a sleep mode, the processor 110 goes to a step of S120.

In the step of S120, the processor 110 transits an operation of the processor 110 to a sleep mode.

Figure 4:
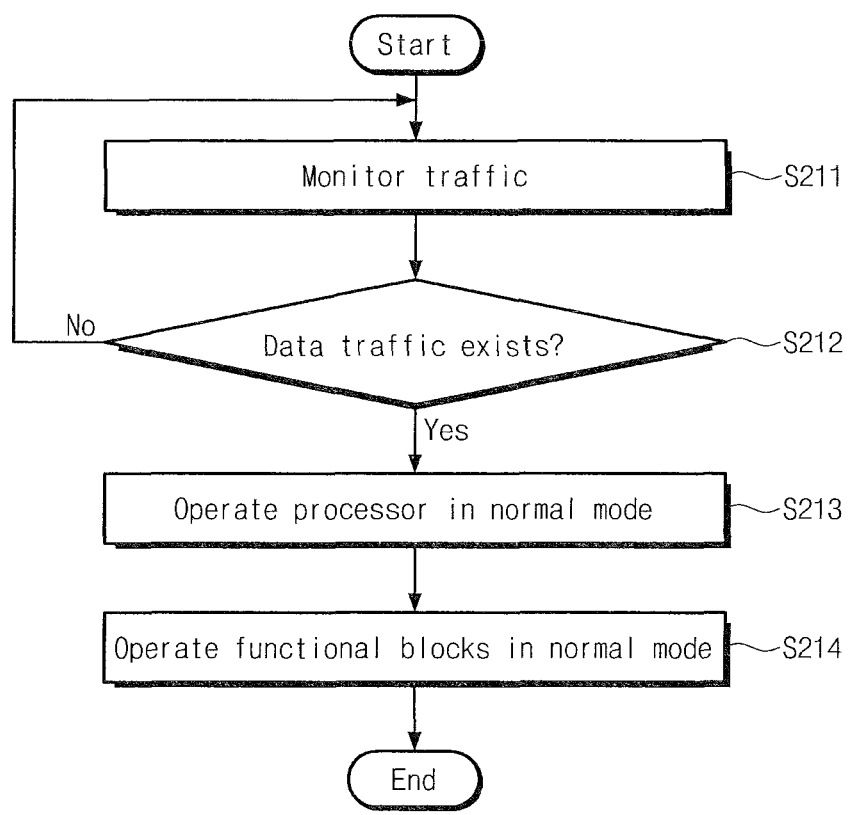
FIG. 4 is a flow chart illustrating a change operation from a sleep mode to a normal mode in an optical network unit in accordance with some embodiments of the inventive concept.

FIG. 4 is a flow chart illustrating a change operation from a sleep mode to a normal mode in an optical network unit in accordance with some embodiments of the inventive concept.

Referring to FIG. 4, in a step of S211, the processor 110 operating in sleep mode monitors traffic. The processor 110 may monitor traffic through the data switching block 130 or the medium access control (MAC) block 150.

In a step of S212, the processor 110 checks whether traffic exists or not through a traffic monitoring. If traffic does not exist according to a check of the step of S212, the processor 110 goes to the step of S211. If traffic exists according to a check of the step of S212, the processor 110 goes to a step of S213.

In the step of S213, the processor 110 operates itself in a normal mode.

In a step of S214, the processor 110 operates the functional blocks 120, 130, 140, 150 and 160 in a normal mode. As an illustration, the processor 110 may transit the functional blocks from a sleep mode to a normal mode in the order of the medium access control (MAC) block 150, the optical transmission-reception block 160, the data switching block 130, the upward physical block 140 and the downward physical blocks 120.

The optical network unit of the inventive concept may efficiently manage power consumption. In particular, the optical network unit may maximize a power saving effect by applying a power saving operation only applied to the optical transmission-reception module to all the functional blocks.

What is claimed is:

1. A method of saving power of an optical network unit comprising: collecting state information of at least one downward physical block and then transiting the downward physical block operating in an idle mode to a sleep mode;
   transiting an upward physical block to a sleep mode if at least one downward physical block transits to a sleep mode;
   transiting a data switching block to a sleep mode if the upward physical block transits to a sleep mode;
   determining a transition of a medium access control block to a sleep mode if the data switching block transits to a sleep mode;
   transiting an optical transmission-reception block to a sleep mode if the medium access control block transits to a sleep mode according to the determination;
   transiting the medium access control block to a sleep mode if the optical transmission-reception block transits to a sleep mode; and
   transiting an operation of a processor to a sleep mode if at least one downward physical block, the upward physical block, the data switching block, the medium access control block and the optical transmission-reception block transit to a sleep mode.

2. The method of claim 1, wherein the state information comprises at least one of a medium access control table, a traffic monitoring statics and an operation interrupt.

3. The method of claim 1, wherein transiting the medium access control block to a sleep mode comprises transiting the medium access control block to a sleep mode if traffic does not exist during a predetermined time through a traffic monitoring of the medium access control block.

4. The method of claim 1, wherein transiting the medium access control block to a sleep mode comprises transiting the medium access control block to a sleep mode if it is checked that the data switching block operates in a sleep mode.

5. The method of claim 1, wherein determining a transition of the medium access control block to a sleep mode comprises:
   transmitting a sleep mode transition request message for requesting a transition of the optical network unit to a sleep mode to an optical line terminal;
   receiving a sleep mode response message corresponding to the sleep mode transition request message from the optical line terminal; and
   determining a transition of the medium access control to a sleep mode if the optical network unit is determined to transit to a sleep mode by the sleep mode response message.

* * * * *